Dec. 22, 1964

C. L. JULIAN 3,162,732

SPRING SUPPORT FOR IGNITION DISTRIBUTOR
BREAKER CONTACT APPARATUS

Filed Oct. 26, 1960

INVENTOR.
CLARENCE L. JULIAN

BY C. R. Meland

HIS ATTORNEY

INVENTOR.
CLARENCE L. JULIAN
BY C. R. Meland
HIS ATTORNEY

Dec. 22, 1964
C. L. JULIAN
3,162,732
SPRING SUPPORT FOR IGNITION DISTRIBUTOR
BREAKER CONTACT APPARATUS
Filed Oct. 26, 1960
3 Sheets-Sheet 3
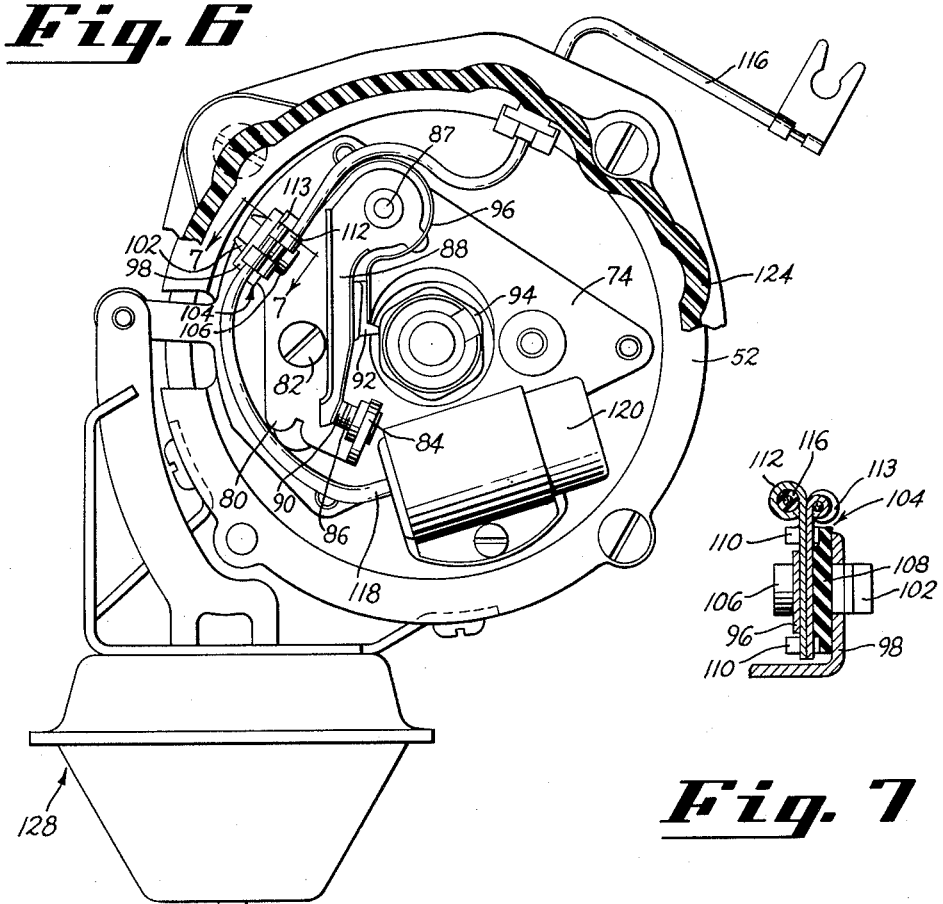
Fig. 6
Fig. 7
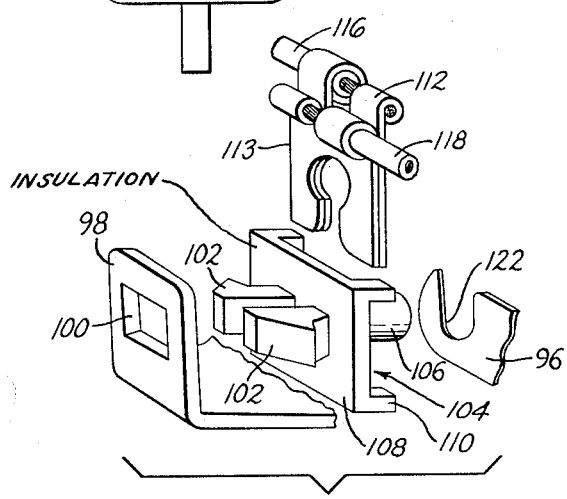
Fig. 8
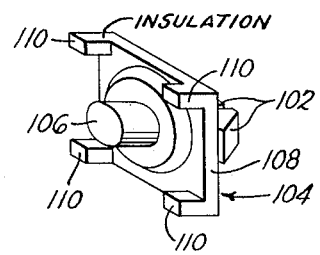
Fig. 9
INVENTOR.
CLARENCE L. JULIAN
BY C. R. Meland
HIS ATTORNEY United States Patent Office 3,162,732
Patented Dec. 22, 1964

3,162,732
SPRING SUPPORT FOR IGNITION DISTRIBUTOR
BREAKER CONTACT APPARATUS
Clarence L. Julian, Anderson, Ind., assignor to General Motors Corporation, Detroit, Mich., a corporation of Delaware
Filed Oct. 26, 1960, Ser. No. 65,069
6 Claims. (Cl. 200—30)

This invention relates to ignition distributors for internal combustion engines.

In presently used distributors the distributor shaft is lubricated from an oil reservoir and is fed by an oiler pipe or is lubricated from a grease cup connected with the distributor base. In either case lubrication to be effective requires periodic attention in that the oiler pipe must be periodically fed with oil or the grease cup turned down and sometimes replenished with grease.

In contrast with the above described methods for lubricating distributors it is an object of this invention to provide a distributor wherein the distributor has a built-in lubrication system that does not require the periodic addition of oil or grease.

Another object of this invention is to provide a distributor wherein the upper bearing of the distributor is lubricated by a permanent wicking material and wherein the lower bearing of the distributor is lubricated by engine oil.

Still another object of this invention is to provide a distributor wherein the upper and lower bearings of the distributor are lubricated with engine oil.

A further object of this invention is to provide a distributor that has a base formed with pockets in its upper end that contain a permanent wicking material for lubricating a bearing, the walls of the pockets also serving to support a bearing member for the distributor shaft, the distributor base supporting another bearing at its lower end which is supported on the faces of fluted portions the grooves of which communicate with the engine when the distributor is installed on an engine.

Another object of this invention is to provide a distributor wherein the base of the distributor has a fluted section that serves to aid in the lubrication of both the upper and lower bearings that journal the distributor shaft.

Still another object of this invention is to provide a distributor wherein the condenser and ignition coil leads are held in place by the spring pressure of the spring of the distributor contact set and thereby eliminate the usual screw fastener that has previously been used to perform this function.

Further objects and advantages of the present invention will be apparent from the following description, reference being had to the accompanying drawings wherein preferred embodiments of the persent invention are clearly shown.

In the drawings:

FIGURE 6 is a view partially in section illustrating the breaker contact mechanism of the distributor shown in FIGURE 4.

FIGURE 7 is a sectional view taken along line 7—7 of FIGURE 6.

FIGURE 8 is an enlarged exploded view showing the method of connecting the condenser and primary lead wires of the distributor to the distributor contact set.

FIGURE 9 is a perspective view of a member that forms a part of the connection for the primary winding lead wire and condenser lead wire of the distributor.

Figures 1, 2, 3:
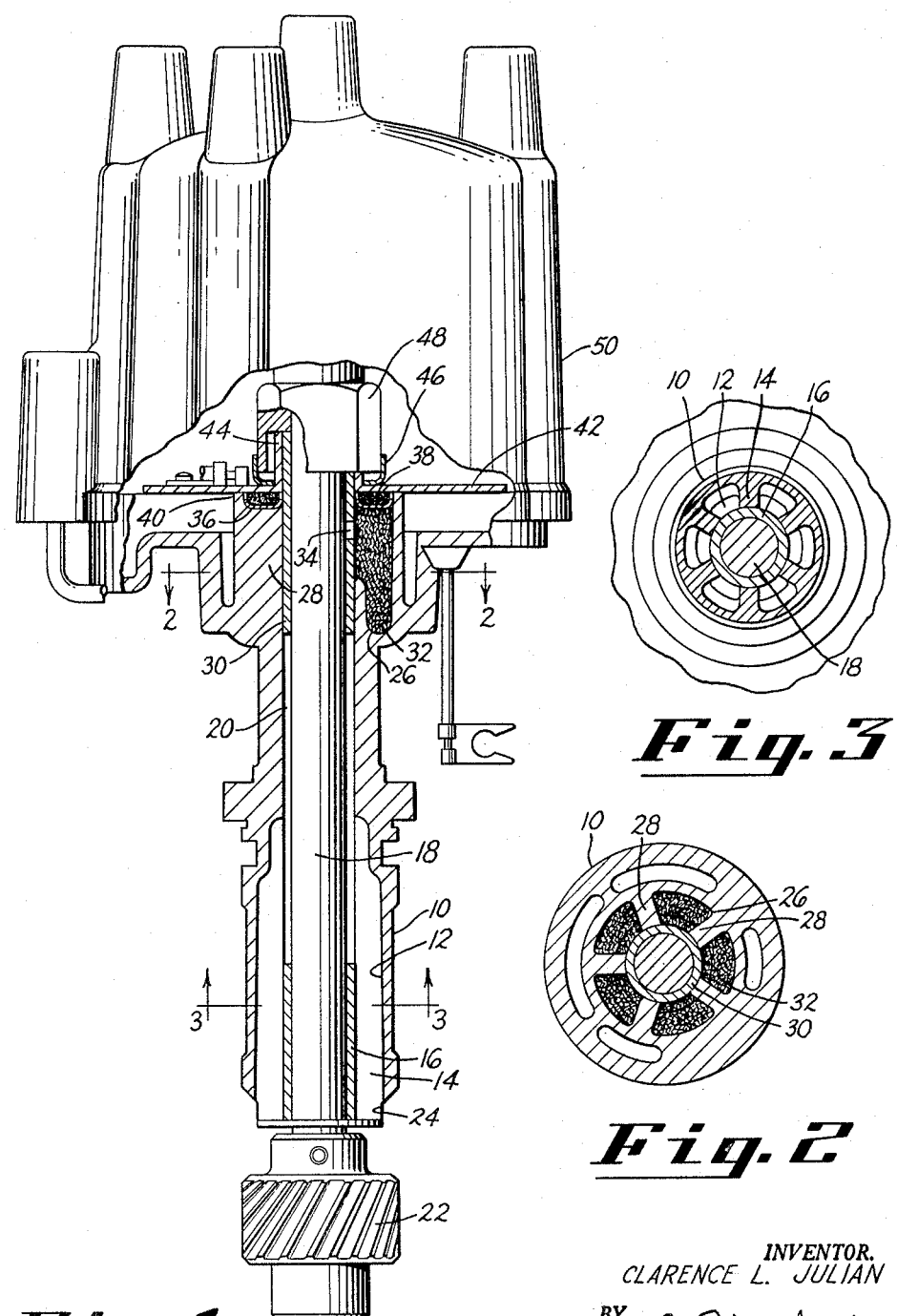
FIGURE 1 is a side elevation partially in section of a distributor made in accordance with this invention.
FIGURE 2 is a sectional view taken along line 2—2 of FIGURE 1.
FIGURE 3 is a sectional view taken along line 3—3 of FIGURE 1.

Referring now to the drawings and more particularly to FIGURE 1 the distributor of FIGURE 1 has a base member generally designated by reference numeral 10 which is preferably formed of die cast aluminium material. The lower end of the base member 10 is fluted as is better shown in FIGURE 3 to provide the grooves 12 which are defined by the radial extending walls 14. The inner faces of the radial extending walls 14 contact a porous metal bushing 16 which serves as the lower bearing for the shaft 18. The shaft 18 extends through the central opening 20 formed in the distributor base and carries a gear 22 which meshes with a gear on the crank shaft of the engine with which the distributor is used. The grooves 12 communicate with the opening 20 of the upper end and are open over the areas 24 so that when the distributor is installed in an engine the grooves are open to the engine.

The upper end of the distributor base 10 is formed with pockets 26 which are defined in part by the radially extending walls 28. The inner faces of the radially extending walls 28 support a porous metal bushing 30 which serves to journal the upper end of the shaft 18. The pockets 26 are filled with a permanent wicking material 32 which is impregnated with a lubricant that is slowly fed to the shaft through the porous metal bushing 30. The porous metal bushing may also be provided with one or two passages 34 for providing initial lubrication to the shaft 18, the other lubrication being provided at a slower rate through the porous metal bushing 30. The top open ends of the pockets or compartments 26 are closed by a lubrication seal 36 which is preferably formed of a plastic material such as nylon. The nylon part carries an annular felt washer 38.

The top end 40 of the base 10 supports a breaker or timing plate which is designated by reference number 42. The breaker plate 42 has an upstanding section 44 which is journaled on the porous metal bushing 30. A metal member 46 is attached to the breaker plate 42 and is seen that the cam 48 which is driven by the shaft 18 has a portion positioned between the member 46 and the upstanding portion 44 of the breaker plate. The breaker plate 42 carries a contact mechanism of the type shown in the patent to Julian et al. 2,816,968. As the cam 48 rotates the breaker plate contacts are opened and closed in a manner well known to those skilled in the art. The breaker plate 42 of course is connected with a suitable vacuum control assembly which shifts the plate in a manner well known to those skilled in the art.

The shaft 18 of course drives a distributor rotor having a contact that cooperates with the fixed contacts of the distributor cap 50. A suitable centrifugal advance mechanism which is not shown is also provided which varies the angular relationship between the cam 48 and the shaft 18 all of which is well known to those who are skilled in the art and which forms no part of the present invention.

It is pointed out that with the distributor of FIGURE 1 there is no oiler tube and there is no grease cup required and thus the distributor will be adequately lubricated without periodic attention by a serviceman. The permanent wicking material 32 is formed of a composition that includes cellulose fibers impregnated with a lubricant and this lubricant which is slowly fed through the porous metal bushing is sufficient to lubricate the shaft 18 at its upper end and the surface between the upstanding member 44 and the porous metal bushing 30. It thus is seen that no oiler tube is connected with the permanent wicking material 32 and none is required since the permanent wicking material together with the porous metal bushing will serve to adequately lubricate the top end of the distributor. The lower bearing 16 of the distributor is lubricated by engine oil which may be pulled up by the shaft 18 as it rotates. The engine oil also may be splashed or be conducted in vapor form through the grooves 12 to thereby provide good lubrication between the shaft 18 and the inner surface of the porous metal bushing 16. It can be seen that any lubricant pulled up by rotation of the shaft may be returned to the engine through the grooves 12. It is also apparent that any lubricant splashed up into the grooves 12 or conducted there in other ways will serve to lubricate the bearing surface between the bearing 16 and the shaft 18.

Figure 4:
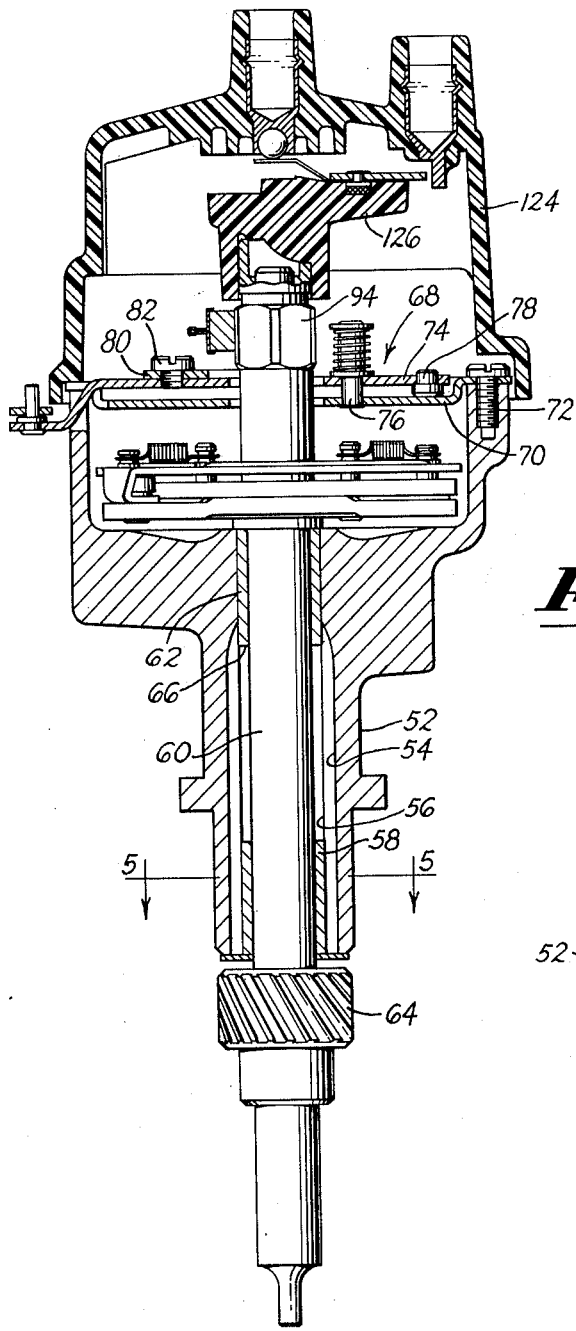
FIGURE 4 is a sectional view of a modified distributor made in accordance with this invention.
Figure 5:
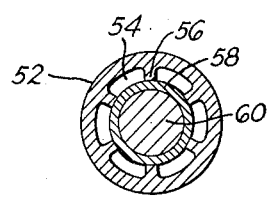
FIGURE 5 is a sectional view taken along line 5—5 of FIGURE 4.

Referring now particularly to FIGURE 4 a modified lubricating arrangement and a modified distributor are illustrated which are made in accordance with this invention. In FIGURE 4 the distributor has a base 52 which is once more formed of die cast aluminium material. The base 52 has a fluted section including the grooves 54 which are defined in part by the radially extending walls 56. The inner faces or surfaces of the radially extending wall 56 support a porous metal bushing 58 which serves as a lower bearing for the shaft 60. The upper end of the base member carries another porous metal bushing 62 which forms the upper bearing for the shaft 60. It is pointed out that the grooves 54 are open at the lower end adjacent the gear 64 which is connected to drive the shaft 60. It is also pointed out that the grooves 54 extend upwardly to a point where they are in communication with the lower end 66 of the porous metal bushing 62.

The upper end of the base member 52 supports a breaker plate assembly which is generally designated by reference numeral 68. This breaker plate assembly includes a plate member 70 which is fixed to the base 52 by the fasteners 72. A second plate member 74 is provided which is pivoted to a pin 76 carried by the plate member 70. The plate member 74 carries bearings 78 which slide on the plate member 70 whenever the plate member 74 is rotated around its pivot point 76.

The plate member 74 as is better illustrated in FIGURE 6 carries a contact assembly that includes the support member 80. This support member 80 is fixed to the plate member 74 by means of a fastener 82. The plate member 80 has a first upstanding flange 84 which carries the fixed contact 86. The fixed plate member 80 carries a post 87 which pivotally supports a breaker arm 88 having the contact 90 which cooperates with the fixed contact 86. The breaker arm 88 carries a rubbing block 92 which cooperates with the cam member 94 that is driven by the shaft 60. A flat spring 96 is connected with the breaker arm 88 in order to urge the contacts 86 and 90 to a closed position. This spring is anchored to an upstanding flange 98 that is formed integral with the plate member 80.

The upstanding flange 98 is illustrated in greater detail in FIGURE 8 and is seen that it is provided with a rectangular opening 100. The rectangular opening 100 receives the teeth 102 formed on a support member generally designated by reference numeral 104. The support member 104 is formed of a suitable insulating material such as nylon and in addition to the teeth 102 is provided with a cylindrical section 106. The cylindrical section 106 and the teeth 102 are separated by a rectangular section 108 which has the projecting lug portions 110.

The support member 104 serves to support the terminals 112 and 113 that are connected respectively with lead wires 116 and 118. The lead wire 116 is connected with the primary winding of an ignition coil whereas the lead wire 118 is connected with the condenser 120. It is seen from FIGURE 8 that both the terminals 112 and 113 have slots which in the assembled condition of these terminals receive the cylindrical portion 106 of the support member 104.

In assembling the support member 104 to the upstanding flange 98 the lugs or teeth 102 are pushed through the rectangular slot 100 until they snap outwardly to tightly grasp the end face of the flange 98. When the support member 104 is in place the terminals 112 and 113 may be slipped on to the cylindrical portion 106. It is pointed out that the width of the terminals is such that they just fit between the lugs 110. The terminals 112 and 113 are prevented from shifting off the cylindrical portion 106 by the end of the spring 96 which has the slot 122. The slot 122 receives the post 106 and it can be seen that this spring exerts pressure on the terminals 112 and 113 to hold them in place between the spring 96 and the wall 108 of the support member 104. The support member being of insulating material serves to insulate both the terminals 112 and 113 as well as the contact spring 96 from the metal flange 98.

It can be seen that with the use of the support member 104 it is relatively simple to make the connection between the lead wires 116 and 118, and the contact spring 96. In addition the usual fasteners and installation parts that are ordinarily required for such a connection as shown in FIGURE 8 are eliminated.

The base member 52 carries a distributor cap 124 which cooperates in the usual manner with the rotor 126. It is seen that the plate member 74 is shifted by a vacuum control assembly which is generally designated by reference number 128.

It is pointed out that with the lubrication system of the embodiment illustrated in FIGURE 4 engine oil is used to lubricate both the upper bearing 62 and the lower bearing 58. It thus is seen that no oiler tube or reservoir is required for lubricating the upper bearing 62. With the distributor of this invention engine oil may be pulled up to the bearings by the shaft 60 as it rotates and excess oil may be returned to the engine through the passages 54. It is also apparent that oil may be splashed up into the passages 54 since they are open at their lower end and any oil mist may enter this area to provide lubrication for the upper bearing 62 and the lower bearing 58. The FIGURE 4 arrangement therefore requires no periodic servicing insofar as lubrication is concerned since the construction of FIGURE 4 provides a self lubrication arrangement using engine oil. It is of course appreciated by those skilled in the art that the lower end of the base 52 is inside the engine when the distributor is mounted on an engine.

What is claimed is as follows:

1. A contact set for a distributor comprising, a plate member, said plate member having first and second upstanding flanges, a breaker contact carried by said first flange, a breaker lever pivotally mounted with respect to said plate member and carrying another breaker contact that cooperates with the breaker contact carried by said first flange, a spring connected with said breaker lever, an opening in said second flange, a support member formed of insulating material having means passing through said opening and engaging said second flange member for holding said support member in place with respect to said second flange member, said support member having a cylindrical projecting portion that is received in a slot formed in said spring member, said support member further having a section from which said cylindrical portion extends, and a plurality of shoulders extending respectively from the corners of the said section.

2. A distributor comprising, a base member, a first porous metal bushing supported in the upper end of said base member, said base member being provided with a plurality of circumferentially spaced longitudinally extending grooves defined by longitudinally and radially extending walls, said grooves communicating with at least a portion of the area surrounding at least a portion of said first porous metal bushing, and being open at their lower ends, a second porous metal bushing supported by the inner faces of said radially and longitudinally extending walls positioned at the lower end of said base member, a shaft journalled for rotation in said porous metal bushings, a cam member carried by said shaft, and breaker contact apparatus operated by said cam member.

3. A distributor comprising, a base member having a plurality of internal longitudinally extending and circumferentially spaced grooves open at their lower end and defined by radially and longitudinally extending walls, a first porous metal bushing supported by the internal faces of said walls adjacent the lower end of said base member, a second porous metal bushing, supported by said base member, at least a portion of said second bushing being in communication with the upper end of said grooves, a shaft journalled for rotation in said porous metal bushings, a cam carried by said shaft, and breaker contact appartus operated by said cam.

4. A contact set for a distributor comprising, a metal plate member having first and second upstanding flanges, a breaker contact carried by one of said upstanding flanges, a breaker lever pivotally mounted with respect to said plate member and carrying a breaker contact that cooperates with the contact carried by said one upstanding flange, an insulator member carried by said other upstanding flange, and a contact spring having a portion secured to said breaker lever and another portion supported by said insulator member, said contact spring and breaker lever both being disposed between said upstanding flanges and said contact spring being held to said insulator member solely by its own spring bias.

5. In an ignition distributor, the combination comprising, a plate member having first and second integral upstanding flanges, a first contact carried by one of said flanges, a breaker lever pivotally supported by said plate member and carrying a contact which cooperates with said first contact, a one-piece supporting member formed of insulating material carried by said other flange having a projecting portion, a flat spring connected with said breaker lever for urging said breaker lever toward said fixed contact, and a lead wire adapted to be connected with an ignition coil, said lead wire being connected with a terminal, said terminal having a slot receiving said projecting portion of said supporting member, said spring having a slot receiving said projecting portion and holding said terminal in place solely by the clamping force of said spring, said spring and terminal being located on the inside of said supporting member with said terminal being disposed between said supporting member and said spring.

6. In an ignition distributor, the combination comprising, a plate member, first and second upstanding flanges integral with said plate member, a first breaker contact carried by said first upstanding flange, a breaker lever pivotally mounted with respect to said plate member and carrying a second breaker contact that cooperates with said first breaker contact, a flat spring secured to said breaker lever, a one-piece support member formed of insulating material carried by the other of said flange members having a projecting portion, and a terminal connected with a lead wire, said terminal having a slot receiving said projecting portion of said support member, said spring having a slot receiving said projecting portion of said support member, said terminal and spring being located between said support member and said first upstanding flange with said spring forming a clamping means for holding said terminal in place solely by the spring pressure exerted by said spring, said support member forming the sole means for fixing said spring in place.

References Cited in the file of this patent

UNITED STATES PATENTS

| 2,133,413 | Arthur | Oct. 18, 1938 |
| 2,465,529 | Grant | Mar. 29, 1949 |
| 2,635,150 | Spang | Apr. 14, 1953 |
| 2,649,884 | Westover | Aug. 25, 1953 |
| 2,724,748 | Tautz | Nov. 22, 1955 |
| 2,791,649 | Baker | May 7, 1957 |
| 2,816,968 | Julian et al. | Dec. 17, 1957 |
| 2,835,755 | Filko | May 20, 1958 |
| 2,851,546 | Phelon et al. | Sept. 9, 1958 |
| 2,868,903 | Filko | Jan. 13, 1959 |
| 2,896,035 | Harrington et al. | July 21, 1959 |
| 2,936,015 | Rapata | May 10, 1960 |

FOREIGN PATENTS

| 770,316 | France | June 25, 1934 |
| 726,317 | Great Britain | Mar. 16, 1955 |